US008611709B2

United States Patent
Chang et al.

(10) Patent No.: US 8,611,709 B2
(45) Date of Patent: Dec. 17, 2013

(54) COUPLED WAVEGUIDE PHOTO DETECTOR WITH NON-UNIFORM COUPLING COEFFICIENT

(75) Inventors: William S. C. Chang, San Diego, CA (US); Paul K. L. Yu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 348 days.

(21) Appl. No.: 12/991,505

(22) PCT Filed: May 12, 2009

(86) PCT No.: PCT/US2009/043615
§ 371 (c)(1),
(2), (4) Date: Jan. 31, 2011

(87) PCT Pub. No.: WO2009/140271
PCT Pub. Date: Nov. 19, 2009

(65) Prior Publication Data
US 2011/0116742 A1    May 19, 2011

Related U.S. Application Data

(60) Provisional application No. 61/127,302, filed on May 12, 2008.

(51) Int. Cl.
*G02B 6/26* (2006.01)
*G02B 6/42* (2006.01)

(52) U.S. Cl.
USPC ............................................. 385/28; 385/31

(58) Field of Classification Search
USPC ............... 385/14, 28, 29, 30, 37, 42, 50, 131; 372/20, 45–50, 51, 130–132
See application file for complete search history.

(56) References Cited

U.S. PATENT DOCUMENTS

| 6,330,378 | B1 * | 12/2001 | Forrest et al. ................... 385/14 |
| 6,728,429 | B1 * | 4/2004 | Melman et al. .................. 385/12 |
| 6,813,431 | B2 * | 11/2004 | Davids et al. .................. 385/129 |
| 7,272,158 | B1 * | 9/2007 | Hayes et al. ..................... 372/21 |
| 2005/0145783 | A1 | 7/2005 | Zheng |
| 2006/0093967 | A1 * | 5/2006 | Block ........................... 430/321 |
| 2006/0198404 | A1 * | 9/2006 | Henrichs ..................... 372/29.02 |

FOREIGN PATENT DOCUMENTS

JP    07-183560    7/1995

* cited by examiner

*Primary Examiner* — Akm Enayet Ullah
(74) *Attorney, Agent, or Firm* — Greer, Burns & Crain Ltd.

(57) ABSTRACT

An embodiment of the invention provides a coupled waveguide photo detector device. Optically, the device includes an input waveguide. An output waveguide is coupled to the input waveguide with a nonuniform coupling coefficient in a coupling section. An absorber is included in the coupling section to convert an absorbed portion of optical radiation into photo current. The location of absorber and the optical radiation intensity pattern in the coupling section are set to control the maximum intensity of output power absorbed by the output waveguide to be within a predetermined limit that avoids saturation. The absorber is also part of a transmission line collector which has a phase and group velocity to match those of the optical wave in the coupling section such that currents collected by the transmission line collector add in phase as the optical wave propagates in the output waveguide.

31 Claims, 6 Drawing Sheets

COUPLED WAVEGUIDE PHOTO DETECTOR WITH NON-UNIFORM COUPLING COEFFICIENT

PRIORITY CLAIM AND REFERENCE TO RELATED APPLICATION

Priority is claimed pursuant to 35 U.S.C. §119 and all applicable statutes and treaties from prior U.S. provisional application Ser. No. 61/127,302, filed on May 12, 2008.

STATEMENT OF GOVERNMENT INTEREST

This invention was made with government support under contract No. N66001-02-2-8938 TDL 46 awarded by Defense Advanced Research Projects Agency (DARPA) via the Space and Naval Warfare Systems (SPAWAR). The government has certain rights in the invention.

FIELD

A field of the invention is photo detection. An example application of the invention is high power, large bandwidth photo detection. A particular preferred application of the invention is in digital and analog fiber optic communication systems. Another preferred application of the invention is to solar panels.

BACKGROUND

Photo detectors convert radiation into electrical energy. Their operation is critical to many mixed signal environments, e.g., optoelectronics, and is also useful for energy conversion, e.g., solar panels. However, typical photo detectors saturate and generate more non linear distortion at high optical powers. This limits the performance of many systems that depend upon low distortion operation. Nonlinear distortion at high optical power can be reduced by distributing photo current evenly over larger detector areas, reducing current congestion inside detectors and more uniform and better conduction of heat generated by the photo current.

Optoelectronic systems use directional couplers to transfer energy from one waveguide to another. A conventional directional coupler shown in FIG. 1A consists of two parallel waveguides that are coupled to each other via their evanescent fields within a specific interaction section where the gap between the waveguides is smallest. Energy is transferred from the input waveguide to the output waveguide.

Figure 1A:
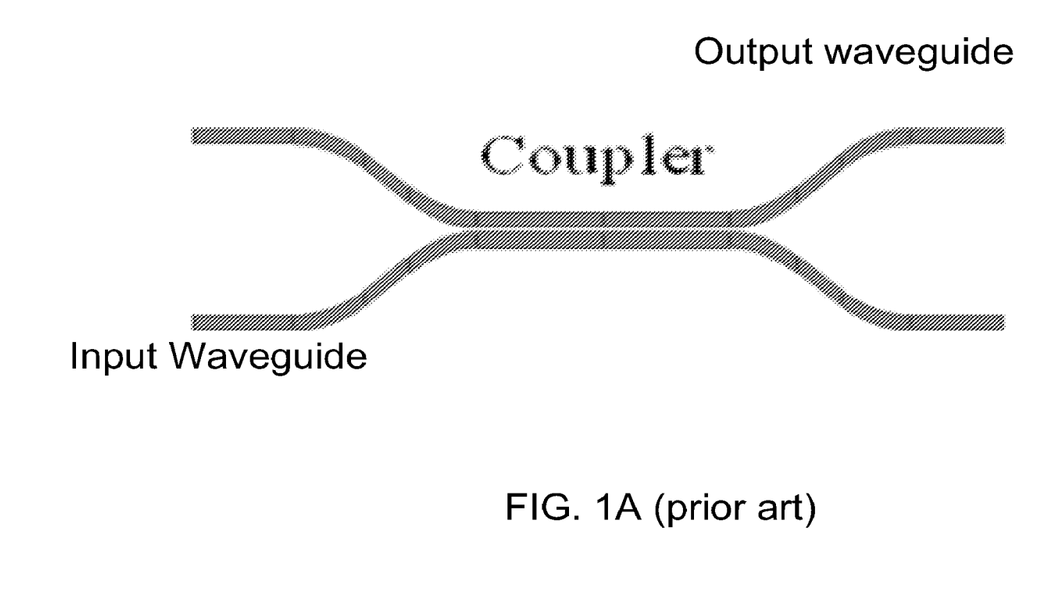
FIG. 1A (prior art) is a schematic diagram that illustrates conventional directional waveguide coupler.

The conventional directional coupler of FIG. 1A delivers a specific fraction of optical power from the input waveguide to the output waveguide after a specific coupling length. The percentage can range from 0% to 100%. Interaction between the input waveguide and the output waveguide in the coupling region is passive. Optical signals are passed from the input waveguide to the output waveguide. Power not transferred to the output waveguide is retained in the input waveguide. In all conventional directional couplers, the sum of the output powers in the input and output waveguides equals to the input power.

Figure 1B:
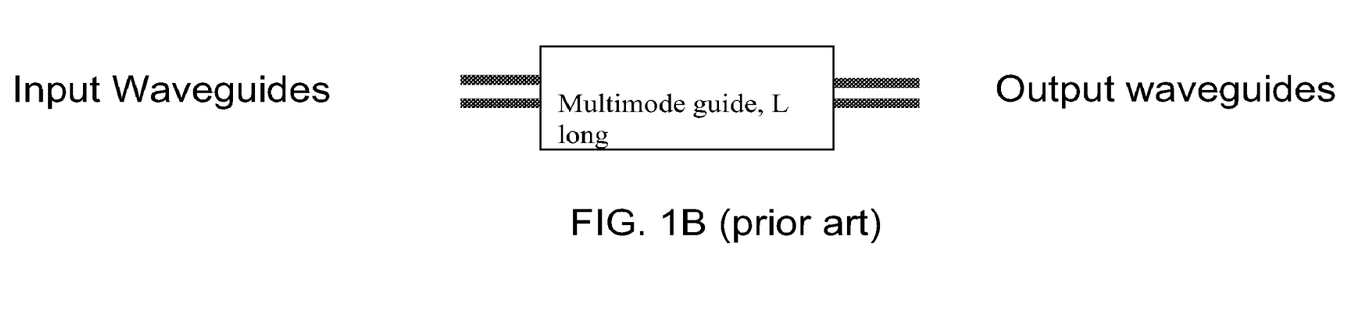
FIG. 1B (prior art) is a schematic diagram that illustrates a conventional multimode directional coupler that has two input waveguides and two output waveguides.

The waveguides in the conventional directional coupler of FIG. 1A are designed to have negligible propagation and coupling loss to minimize insertion loss. The two waveguide modes can be somewhat different. As long as the two waveguide modes have the same effective index, the power transfer can reach 100%. When the effective index of the modes or the coupling of the modes is changed by electro-optical effects then the power transfer is controlled electro-optically, and the device acts as a directional modulator. In the FIG. 1A device, reducing the gap of separation between waveguides in the coupling region to zero creates a multi-mode waveguide. When input and output waveguides are connected to a multimode section as shown in FIG. 1B, it becomes a multimode interference coupler. Conventional multimode interference couplers have uniform cross section. The interference of the modes excited by the incident input radiation distributes various fractions of power into the output waveguides after specific length L of propagation in the multimode waveguide.

Conventional photo detectors absorb incoming optical radiation and convert the absorbed photons into electrical carriers. The electrical carriers are collected by collector electrodes. The collected photo current generates an electrical signal to the external circuit. Ideally, this electric signal is directly instantaneously proportional to the variation of the absorbed optical power. In reality, the proportionality between the electrical and optical signals may be slightly nonlinear because of thermal heating, carrier screening and crowding, and other effects. These nonlinearities vary from detector to detector because of variations in their material, optical design and electrical design. For example, some photo detector designs have better thermal conduction. Some photo detectors have more uniform distribution of electrical carriers. However, the nonlinearity increases significantly at high optical power for all photo detectors.

There are two types of photo detectors: surface normal photo detector and waveguide photo detectors. In surface normal detectors, radiation is incident normal to the absorption medium which generates photo current. In waveguide detectors, radiation is incident into an optical waveguide, and it propagates down the waveguide. Absorbing media (collectors or photo detectors or detector) are imbedded into (or near) the waveguide so that the photo currents (or current) are collected together to yield the detector current.

The device capacitance C of surface normal photo detectors limits their electrical bandwidth because of the RC time constants in the electrical circuit. The device capacitance C is proportional to the detector area. Smaller detector areas therefore provide larger electrical bandwidths but also provide small signals. Smaller detector areas also have higher photocurrent density in the detector for a given incident optical power. Higher photocurrent densities can cause detector saturation. This constraint causes typical high optical power surface normal detectors to have relatively large electrode areas and low operating bandwidths.

In typical conventional waveguide photo detectors, the optical power is coupled directly to the waveguide used for detection. The optical intensity is the highest at the input end. In conventional waveguide photo detectors that use evanescent coupling between an absorbing waveguide and a passive waveguide where the optical wave is launched, the optical intensity is also highest at the input end. This still results in high peak photocurrent density in the absorbing waveguide.

SUMMARY OF THE INVENTION

An embodiment of the invention provides a coupled waveguide photo detector device. Optically, the device includes an input waveguide. An output waveguide is coupled to the input waveguide with a nonuniform coupling coefficient in a coupling section. An absorber is included in the coupling section to convert an absorbed portion of optical radiation into photo current. The location of absorber and the optical radiation intensity pattern in the coupling section are set to control the maximum intensity of output power absorbed by the output waveguide to be within a predetermined limit that avoids saturation. The absorber is also part of a transmission line collector which has a phase and group velocity to match those of the optical wave in the coupling section such that currents collected by the transmission line collector add in phase as the optical wave propagates in the output waveguide.

DETAILED DESCRIPTION OF THE PREFERRED EMBODIMENTS

In a waveguide photo detector of the invention, currents are induced in an electrical transmission line. To achieve in-phase addition of electrical currents collected from different photo detectors or different parts of the extended photo detector structure while the optical wave propagates, the currents induced in the coupling section in different parts of the extended detector or a series of detectors are transmitted via an electrical transmission line which is velocity matched to the optical waveguide.

An embodiment of the invention provides a directional coupled waveguide photo detector device. The device includes an input waveguide. An output waveguide is optically coupled to the input waveguide through a coupling section. Coupling is achieved in the coupling section with two coupled waveguides (portions of the input and output waveguides similar to a directional coupler) or a multimode interference coupler. The coupling section preferably has a nonuniform coupling coefficient. An absorber (or a series of discrete absorbers) in the coupling section absorbs optical radiation. Since the radiation pattern in the coupling section varies, the location and the configuration of the absorber are chosen so that it absorbs a uniform amount of optical radiation at different parts of the absorber. Photo current generated in the absorber (or absorbers) is collected via associated electrodes to yield photo detection of the optical radiation. The coupling section and the absorber are configured to control the photo-current density distribution generated in the absorber (or in separate absorbers) such that the maximum photo current density (or maximum photo current collected by individual absorber) will be within a predetermined limit to avoid saturation in the output waveguide. The material structure of the absorber and associated electrode (i.e., the collector) structure is designed to avoid photo generated carrier crowding to reduce non linear distortion at high optical power. Such an absorber and electrode structure requires a highly unsymmetrical coupling section. This can be achieved, for example, by making the output waveguide that has the absorber much thicker with high index material layers than the input waveguide. The collector, which includes the electrodes and the absorber will have electrical capacitance. If this capacitance is connected simply to an external circuit, the bandwidth of the detector will be limited by the RC time constant of the circuit. In the invention, inductance is added to the electrode structure so that it forms a microwave transmission line. This transmission line collector has a phase and group velocity to match an optical wave in the coupling section such that currents collected by the transmission line collector add in phase as the optical wave propagates in the coupling section. If a series of absorbers are used, the absorbers/detectors are connected via a transmission line so that phase matching with the propagating optical wave is achieved. The material, the electrode, the absorber and the waveguide configuration can be optimized for uniform temperature distribution and efficient thermal conduction of the heat generated by the photocurrent.

The invention provides a waveguide photo detector that can actively respond to wide fluctuations in input power without losing or distorting an information signal. Such a waveguide photo detector of the invention is especially well suited for optoelectronics, including optical communication systems and optical computing systems. Embodiments of the invention make constructive use of absorption in the coupling section of a directional or a multimode coupler so that the photo current distribution in the extended detector or in a series of detectors is evenly distributed.

Embodiments of the invention add absorptive media (semiconductor material with a suitable bandgap for absorption), associated electrode and p-i-n or similar junction structure in an electrical transmission line to the output waveguide of a directional coupler intentionally and provide a nonuniform coupling coefficient between an input waveguide and an output waveguide. The nonuniform coupling coefficient and the absorptions in the output waveguide are predetermined to ensure that the photo current density generated in the absorber will not exceed a limit.

Alternatively, embodiments of the invention include the addition of absorptive media, associated electrode and p-i-n or similar junction structure to a multimode coupling section. The absorber/collector will be placed at locations to ensure that the photo current density of the absorbed radiation will not exceed a predetermined limit. This limit is set to achieve a linear and efficient conversion of absorbed power into an electrical signal at high optical power and avoid saturation of the output waveguide. The absorption can be continuous, sectional continuous, or discontinuous. An embodiment of the invention is a waveguide photo detector that provides robust performance across a wide range of optical power, eliminating the non-linearities experienced in current technologies when the detector enters its saturation mode due to high local photo carrier density.

An embodiment of the invention provides a directionally coupled waveguide photo detector device that distributes the absorbed incident optical power evenly into an extended absorber or plurality of absorbers to avoid both saturation and added nonlinear distortion. The photo current generated in the absorber (or absorbers) is collected by the electrodes and transmitted to the load via electrical circuits. Photo currents collected by the electrodes (or different parts of an extended electrode) add in phase even at high microwave frequencies.

Embodiments of the invention permit considerable flexibility in the material design of the absorber, the electrode, the detector configuration and the optical waveguide. For example, different doping technologies and detector configurations can be utilized to minimize the contact resistance of the device. Current crowding can be reduced via an optimized heterojunction material structure. Materials such as electroabsorptive material can be used for absorber so that absorption can be controlled by electrical bias voltages. Material structures with substantial thickness and high refractive indices that form a highly unbalanced directional or multimode coupling sections are utilized in preferred embodiments. The absorber, the electrode and the associated heterojunction structure is constructed to include capacitance and inductance to form an electrical transmission line with group and phase velocities matched to the propagating optical waves in the waveguide.

Preferred embodiments use linear detector for each individual collector/absorber (or parts of the collector/absorber) at low and moderate power. The coupling section is then tailored to obtain the desired optical photo current distribution in the absorber (or absorbers).

Preferred embodiments employ thermal designs that limit the maximum temperature at any portion of the absorber (or absorbers) generated by the photo current.

An embodiment of the invention is a coupled waveguide photo detector device that has an input waveguide and an output waveguide optically coupled to the input waveguide through a coupling section. The coupling section can be a directional coupler or multimode coupler. An absorber/collector is included in the coupling section to convert the optical radiation into photo current. The coupling section together with the absorber/collector is configured so that photo-current is evenly distributed and that the maximum photo density in the absorber/collector is within a predetermined limit. The absorber/collector is a part of a transmission line that has phase and group velocity to match those of an optical wave in the coupling section, such that currents collected by the transmission line collector add in phase as the optical wave propagates in the output waveguide. In the case of directional coupler, the coupling section is an asymmetrical directional coupler which has variable gap. The absorber(s) is located on the output waveguide in the coupling section. The nonuniform coupling coefficient created by the variable gap and the absorber(s) is set so that portions of the input waveguide having higher optical power couple less efficiently to the output waveguide than portions of the input waveguide having less optical power. In the case of a multimode coupling section, the optical wave propagates in the interference pattern of the modes. Thus the radiation intensity absorbed by the absorber depend on the waveguide configuration and the location and configuration of the absorber and collector. The multimode waveguide and the absorber and collector are set so that photo-current is evenly distributed and that the maximum photo current density in the absorber and collector is within a predetermined limit.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 2A:
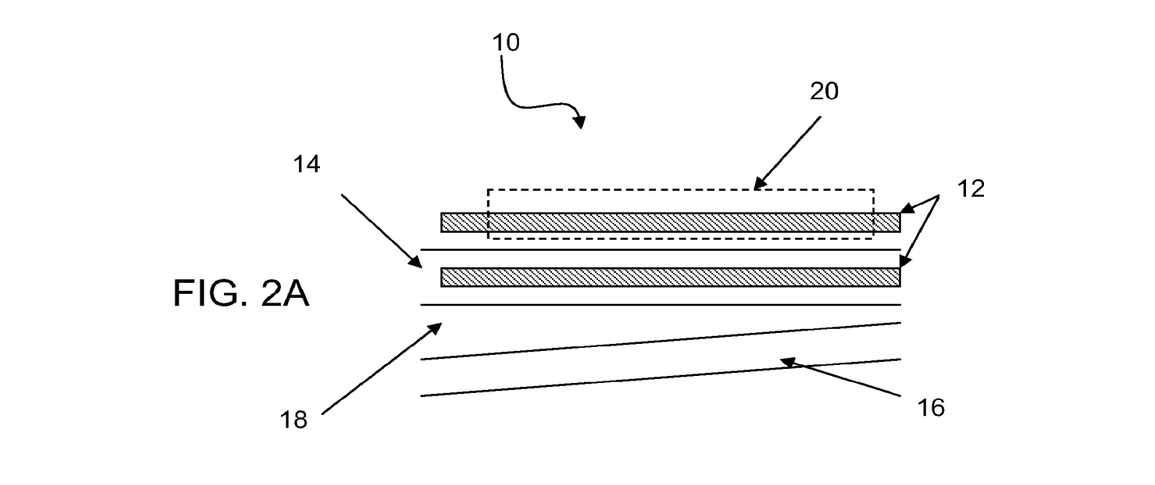
FIG. 2A is a schematic diagram that illustrates the coupling region of a preferred embodiment variable gap coupler waveguide photo detector of the invention having a continuous collector.
Figure 2B:
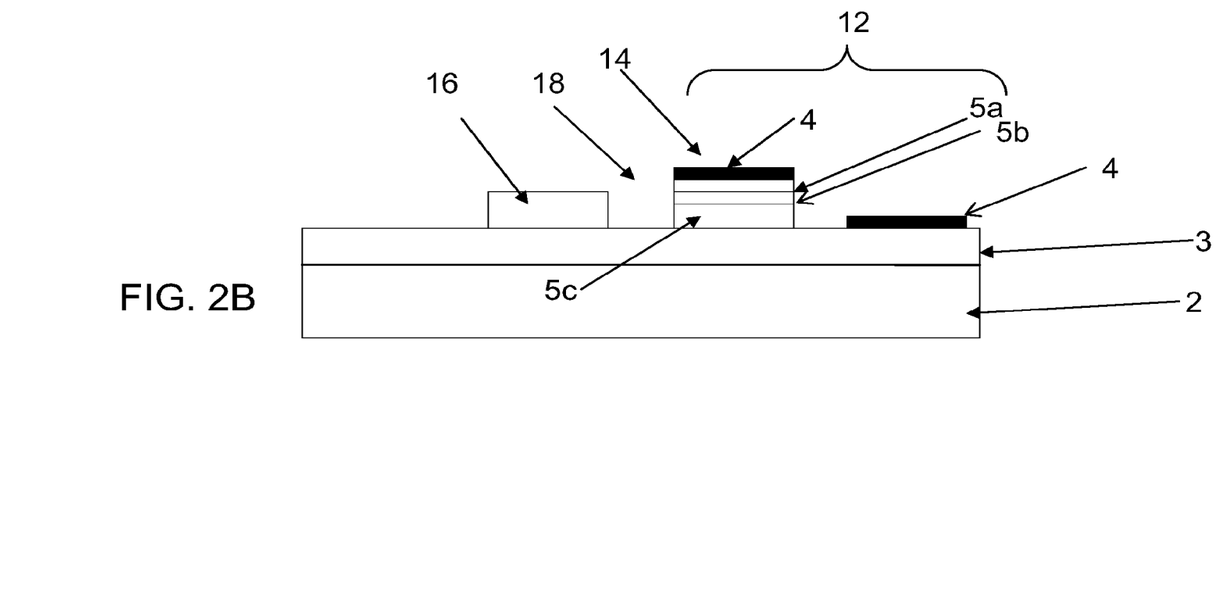
FIG. 2B a schematic cross section view of the coupler section of FIG. 2A.

FIGS. 2A and 2B illustrate the coupling region of a preferred embodiment directional variable gap coupler waveguide photo detector of the invention having a continuous collector. As seen in FIG. 2B, which shows an example p-i-n embodiment of the invention, a substrate 2 supports a n+ doped layer and waveguide 3, a pair of electrodes 4, and the associated heterojunction (e.g., p-i-n) structure 5a, 5b, 5c form an electrical transmission line 12. The waveguide 3 can include any conventional structure, and details of the waveguide 3 are therefore not illustrated in FIG. 2B. Absorber material (semiconductor material with bandgap suitable for photo absorption) is used for one of the layers 5a, 5b, 5c and is forming part of a ridge that forms the output waveguide 14 so that portion of the optical energy in the output waveguide 14 is absorbed. Such absorbed energy is converted into photo current in the absorber 5a, 5b, or 5c. The photo current is transferred by the transmission line 12 in the coupling region to other circuitry (not shown). The electrodes 4 and the layers 5a, 5b, and 5c that are part of the transmission line 12 accomplish a continuous reverse biased vertical p-i-n detector structure which serves as the collector of the photo current. Other continuous or discrete collector configurations such as horizontal p-i-n, or m-i-m, or n-i-n detector structures can be used. A passive input waveguide 16 transfers optical energy into the output waveguide 14. Because of the p-i-n and electrode structure on the output waveguide, this directional coupler is optically highly asymmetrical.

There is not a constant gap between the input waveguide 16 and the output waveguide 14. Instead, there is a variable gap 18. This variable gap coupling is set so that portions of the input waveguide 16 having higher optical power couple less efficiently to the input waveguide 16, i.e., the highest optical power portion of the input waveguide 14 couples the least efficiently to the output waveguide 16. With this nonuniform coupling coefficient, photocurrents collected by different parts of the continuous collector can be uniformly distributed. In order to maximize the total photocurrent transmitted to other circuitry, the photo currents collected by different parts of the continuous collector must add in phase. In FIG. 2A, the variable gap 18 is realized with an angled separation between the straight input waveguide 16 and the output waveguide. Curves can also be used for variable separation. The electrical transmission line 12 has a phase and group velocity to match the optical wave in the output waveguide 14 such that the collected currents add in phase as the optical wave propagates. In preferred embodiments, a heat sink 20 (FIG. 2A) is bonded to an electrode 4 of the transmission line 12 to provide thermal conduction.

Figure 3:
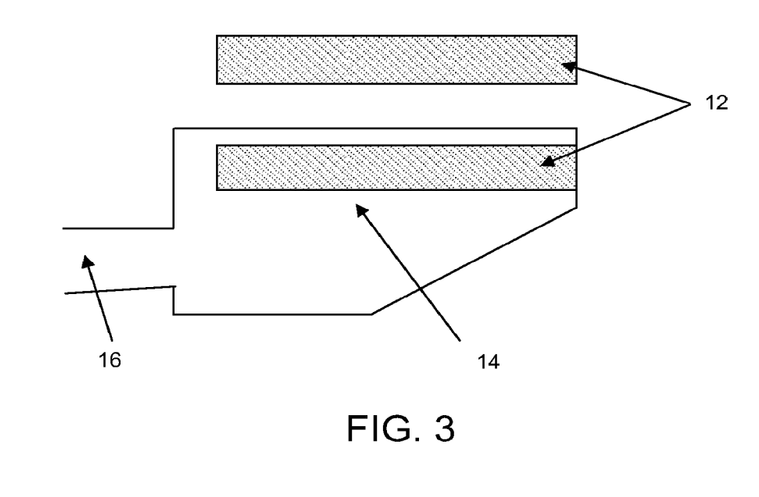
FIG. 3 is a schematic diagram that illustrates the coupling region of a preferred embodiment multimode directional coupled waveguide photo detector of the invention.

FIG. 3 shows another preferred embodiment nonuniform coupling coefficient coupler that uses a multimode coupling region. The p-i-n collector structure (having material layers as in FIG. 2A) including absorber material is on the multi-mode coupling region of predetermined shape that forms the multimode coupling section of the output waveguide 14. The radiation pattern of the optical wave propagating in the multi-mode coupling section depends on the waveguide and the absorber/collector materials and configurations. The absorber/collector structure is placed on the location of the multimode waveguide 14 such that optical waves propagating in the multimode coupling region is absorbed uniformly by absorber material in the collector.

The coupling regions in FIGS. 2 and 3 make use of a continuous collector. Since optical radiation is propagating in the output waveguide 14 or in the multimode coupling section, photo currents generated in different parts of the absorber/collector structure will have different phase. The nonuniform coupling coefficient couplings in FIGS. 2A and 2B and the multi-mode section with non uniform cross section in FIG. 3 ensure uniform photo current distribution in the collector. The electrical transmission line 12 is designed so that it has the same phase and group velocity as the optical waves in the output waveguide 14 or in the multimode coupling section. The transmission line design ensures that the currents generated in different parts of the transmission line 12 will add in phase. In the FIGS. 2 and 3 embodiments, the optical waveguide configuration in the coupling region is highly asymmetrical because of a large thickness and the refractive index of the collector structure. Analytical methods such as super-mode analysis, Beam Propagation and Fimm-Wave simulation can be used to design specific waveguide and absorber/collector structure configurations to obtain uniform current distribution at a pre-determined absorption rate. Discrete electrodes/detectors can also be used in place of the transmission lines 12. Then the coupling region between adjacent detectors will have more symmetrical waveguide structures. Each discrete detector will be connected electrically to a parallel transmission line that matches the phase and group velocity of the optical waves.

Figure 4:
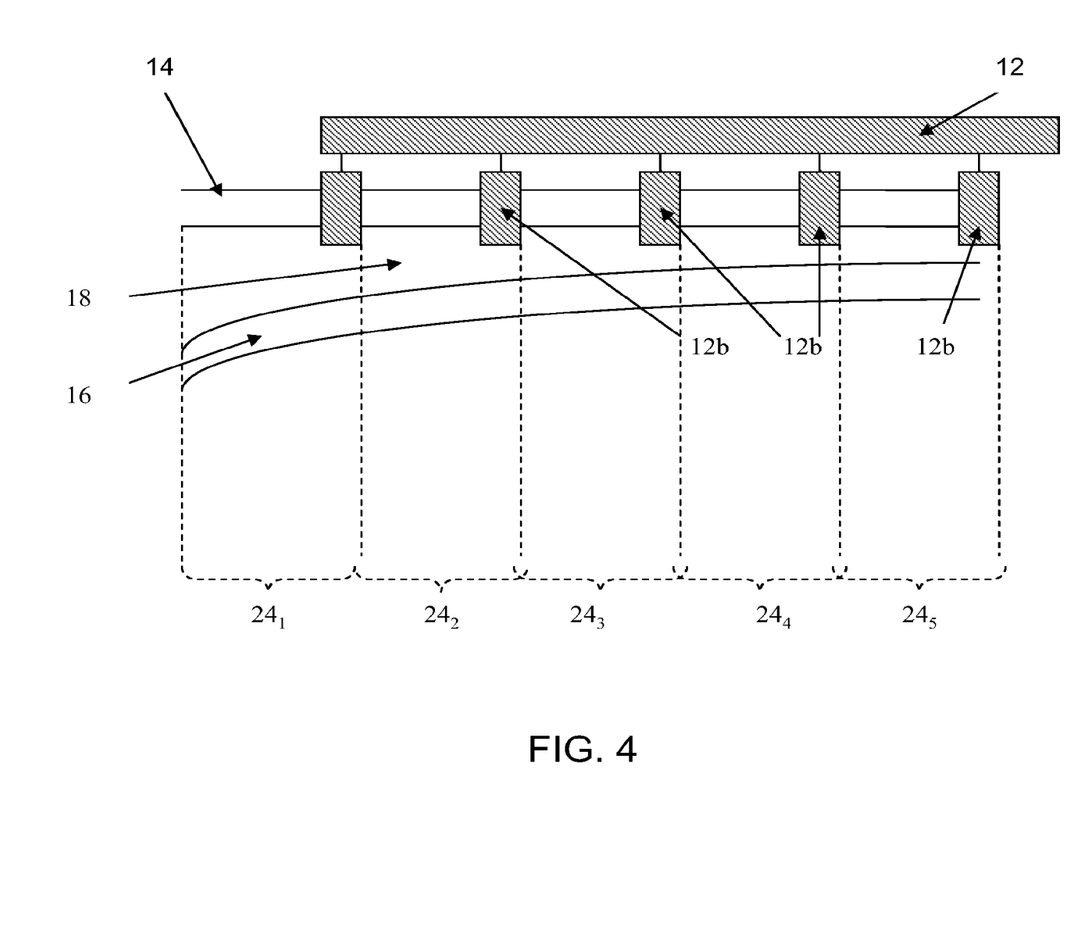
FIG. 4 illustrates a preferred embodiment variable gap coupler waveguide photo detector of the invention having a plurality of discrete collectors.

FIG. 4 shows another preferred embodiment nonuniform coupling coefficient coupler that uses a curved variable gap 18 coupling region and uses discrete collectors 12*b* (having the FIG. 2B material structure) as part of a transmission line 12. There may be a number of discrete collectors 12*b* that convert the optical power incident on the detector into electrical signals. As in FIGS. 2A and 2B, the coupling between the input and output waveguides 16, 14 is varied by the variable gap 18 to control the optical power reaching each detector in the output waveguide 14. The discrete collectors 12*b* divide the coupling region into sections 24$_1$-24$_5$. The coupling length between collectors 12*b* is set at a predetermined distance so that a specific predetermined amount of optical power will be detected by each detector. The transmission line 12 with discrete detectors as loads will have phase and group velocities so that the approximately equal amounts of discrete currents generated from the absorbed radiation will add in phase in the transmission line 12. The approximately equal spacing and photo currents are useful to the design of the electrical transmission line 12. Within each coupling region, 24$_1$-24$_5$, the two waveguides have similar effective index that allow efficient transfer of power from waveguide 16 to waveguide 14. In this example, each discrete absorber/collector could absorb all the optical power.

The directional coupled waveguide photo detectors of FIGS. 2-4 provide great flexibility in the design of the material structure and configuration for the collector. For example, different doping technologies and collector configurations can be used to minimize the contact resistance of the device. The absorber could be located in the i region or in the p or n region of the p-i-n structure. The heterojunctions can be designed to facilitate transport of photo generated carriers into the electrodes with less current crowding. Materials such as electro-absorptive material can be used for absorber so that absorption can be controlled by electrical bias voltages.

In the FIGS. 2-4 embodiments and the invention generally, the waveguide configuration, the absorber material structure and physical location, the collector electrodes 12, 12*b*, and the associated p-i-n structure and transmission line are preferably selected to have three characteristics. A first characteristic is that the photo current densities do not exceed the maximum limit beyond which non-linear distortion increases and detector saturates. A second characteristic is that the electrical carriers generated from the absorbed power be collected efficiently by metallic electrodes (in each single detector for discrete absorbers or in each portion of a continuous absorber) such that the electrical current generated from the carriers will be proportional to the input optical signal with minimum nonlinearity. The heat generated by the photo current should be evenly distributed and conducted away efficiently. A third characteristic is that the photo currents will add in phase in the collector and the transmission line for propagating optical waves in the coupling section. Unlike surface normal detectors, the FIGS. 2-4 embodiments provide freedom to accomplish the first and third characteristics even if opaque metallic materials are used for the electrodes 4 of the transmission lines 12.

Each of the directional coupled waveguide photo detectors of FIGS. 2-4 utilizes the basic coupling mechanism in the directional (or multimode) coupler, not to provide any specific final output power split, but to provide a sequential method to divert only an evenly distributed fraction of the incident power at a time to a set of absorbers or an extended absorber in the waveguide. For each absorber or portion of an extended absorber, no saturation or added nonlinear distortion occurs. At the same time the photo currents collected from each absorber or portion of the extended absorber are collected in an electrical transmission line 12 so that they add in phase to yield the total current even at high microwave frequencies. There is no limit on the material structure that can be used for detection. The material structure of the extended detector (or a set of detectors) can be designed and optimized to facilitate carrier transport and thermal conduction and distribution. The particular embodiments and the invention in general therefore provide a high power large bandwidth photo detector.

It should be noted that while FIGS. 2-4 show horizontally coupled directional coupled waveguide structures, vertically coupled directional coupled waveguide structures can also be used where the gap is achieved via a material layer with precise thickness control. The incident optical power can be distributed evenly to be absorbed by an extended absorber or a set of discrete absorbers in the output waveguide.

Figure 5:
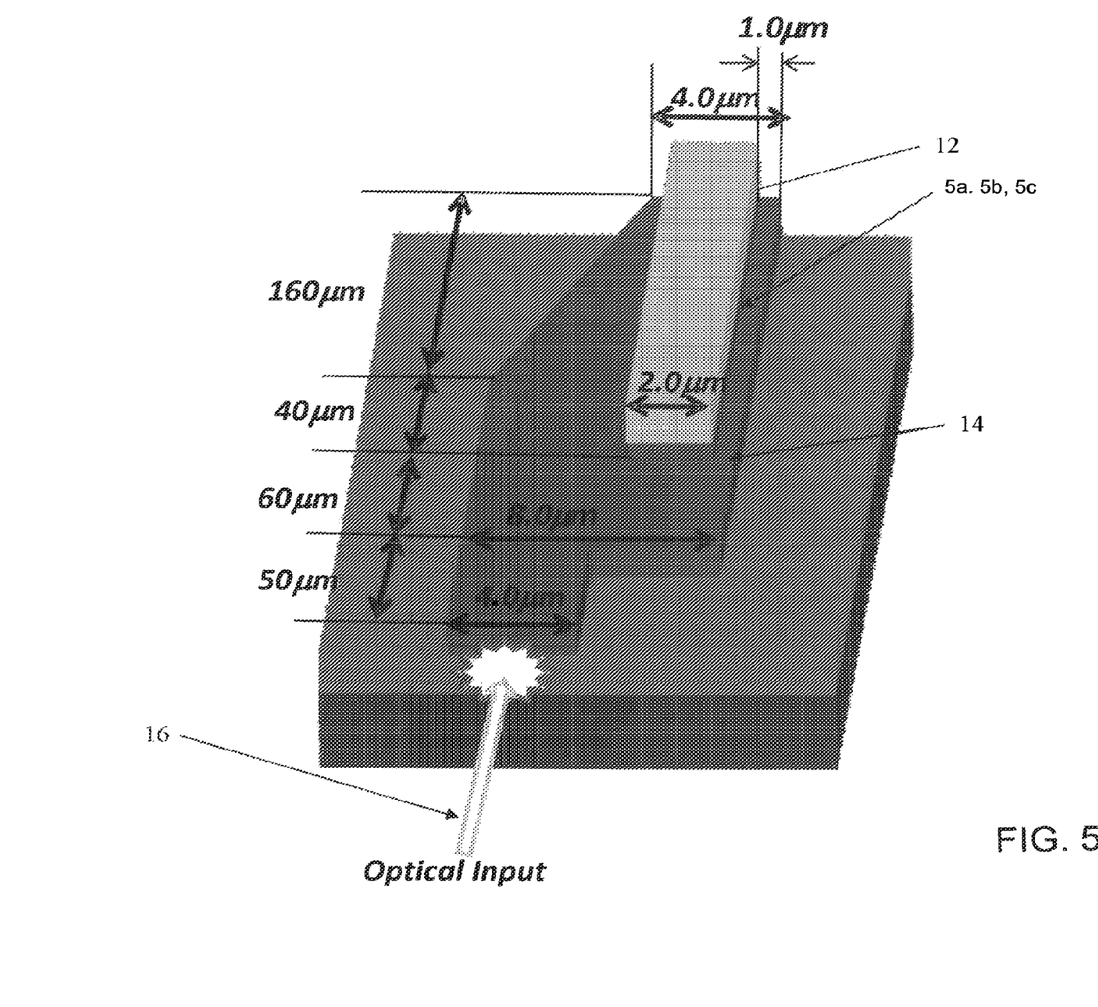
FIG. 5 is a schematic perspective diagram of an example multimode directional coupled waveguide photo detector of the invention.

A particular example fabrication of a coupled detector shown FIG. 3 was fabricated in the form of a multimode coupling section, as shown in FIG. 5. The optical power is initially coupled from the input waveguide 16 to the multimode waveguide 14 so that selective excitation of the modes in the multimode section 14 can be better controlled. Multimode interference begins at the junction of the input and the coupling section. The absorber begins a short distance later to allow the radiation intensity at that transverse region to buildup to a desired value. As the radiation is absorbed the total available optical power is reduced. In order to keep the absorbed optical power uniform in the absorber, more concentration of radiation intensity is obtained by tapering the width of the multimode waveguide 14. In this example design in accordance with FIG. 3, uniform and low absorption per unit length and high sensitivity is achieved over a relatively short absorber length. Thermal profiles of the experimental multimode directional coupled detector structure were highly uniform at an output photocurrent of 100 mA indicating that there was uniform optical power that was not concentrated at the input section.

In embodiments of the invention, saturation effects can be improved significantly by increasing the thermal conduction (or reducing local heating), using a detector material structure that facilitates carrier transport and limiting maximum local optical power absorption. The heat generated along the absorber can be more effectively conducted via the heat sink 20 at the p-electrode side and thus the maximum temperature at the junction can be reduced to prevent thermal runaway. The bandwidth can be improved by designing the capacitance and inductance of electrodes and p-i-n structure so the electrical transmission line containing the absorber/collector will have phase and group velocities matched to that of the optical waves. Embodiments in accordance with FIGS. 2-5 can distribute the incident optical power evenly to be absorbed by an extended absorber or a set of discrete absorbers. The photo current generated in the absorber (or absorbers) is collected to form the detector. The long extended detector (or a set of discrete detectors) is designed as an electrical transmission line so that the local photocurrents created by a propagating optical signal in the directional (or multimode) coupled waveguide will add in phase even at high microwave frequencies. In this way, bandwidth is not be limited by the RC time constant like conventional surface normal detectors. Also, the material structure of the extended detector (or a set of detectors) can be designed to facilitate photo carrier transport and to reduce thermal heating.

Photo detectors of the invention can operate up to the required maximum optical input power without increased nonlinearity. Photo detectors of the invention can also yield the lowest nonlinear distortion at low optical power, and also have large electrical bandwidth. In conventional waveguide photo detectors, the optical power is coupled directly to the waveguide used for detection. The optical intensity is the highest at the input end. Photo current generation at the input end creates the toughest thermal and current crowding problems. In contrast, the absorbed optical intensity in the extended absorber designs of the invention used for photo detection in directional photo detectors always starts with low intensity and increases with distance. The rate of increase and maximum intensity of the absorbed optical power can be controlled conveniently by variation in coupling coefficient or mode interference and by absorption. In the case of directional coupled photo detector using a set of discrete detectors, the power absorbed by each detector is controlled by variation of the coupled power in each segment of the coupler before detection. The directional coupled waveguide photodiode is different from and better than the waveguide integrated photodiode in which the absorber layer is on top of a large mode optical waveguide where incident optical power is coupled. The latter has non uniform photocurrent distribution.

In conventional directional couplers, the propagation constants of the two waveguides are identical or similar. Otherwise efficient transfer of power from one waveguide to another cannot take place. In a conventional multimode interference coupler the multimode section is uniform in cross section. In directional coupled detectors of the invention, the use of an absorber/detector structure that minimizes current crowding and local thermal heating means the directional or multimode coupler is highly asymmetrical. It is not believed that analysis and experimentation of such asymmetric couplers with absorption have been previously conducted.

In conventional surface normal detectors, optical power must be incident on the detector normal to the absorber layer that limits the configuration of the opaque metallic electrodes that can be used to collect the carriers. For example, a ring electrode will allow optical transmission through the center hole, however it may have less uniform current distribution and poorer thermal conduction. In order to use a solid metallic electrode with better thermal conduction and more uniform current density, the optical radiation must enter inconveniently through the back side of the wafer. The circular electrode pattern of the surface normal photo detector precludes the electrode be used as a transmission line in synchronization with optical wave. In the directional coupled photo detector of the invention, the radiation enters the input waveguide. Radiation in the input waveguide is transmitted to the absorber through the side interaction with no interference to the design of detector material and electrode configuration. With photo detectors of the invention any solid metal electrode can be used with the collector. Additionally, thermal sinks can be bonded to the electrodes without worry of affecting the absorption of incident radiation.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A coupled waveguide photo detector device, comprising:
   an input waveguide;
   an output waveguide optically coupled to the input waveguide with a nonuniform coupling coefficient, the nonuniform coupling coefficient being set to control the maximum intensity of output power in the output waveguide for a predetermined rate of absorption within a predetermined limit; and
   a transmission line collector with a phase and group velocity to match an optical wave in the output waveguide such that currents collected by the transmission line collector add in phase as the optical wave propagates in the output waveguide.

2. The device of claim 1, wherein the nonuniform coupling coefficient is set so that portions of the input waveguide having higher optical power couple less efficiently to the output waveguide than portions of the input waveguide having less optical power.

3. The device of claim 2, wherein the nonuniform coupling coefficient coupling between the input waveguide and the output waveguide is achieved with a variable gap between the input waveguide and the output waveguide.

4. The device of claim 3, wherein the variable gap is largest at portion of the input waveguide having the highest optical power.

5. The device of claim 3, wherein the input and output waveguides are straight and angled relative to each other to achieve the variable gap.

6. The device of claim 3, wherein at least one of the input and output waveguides is curved to achieve the variable gap.

7. The device of claim 2, wherein the nonuniform coupling coefficient coupling between the input waveguide and the output waveguide is achieved with an asymmetrical output waveguide.

8. The device of claim 1, wherein the transmission line collector comprises a continuous collector.

9. The device of claim 1, wherein the transmission line collector comprises a plurality of discrete collectors.

10. The device of claim 9, wherein the discrete collectors are spaced apart from each other at a predetermined distance to produce a constant load capacitance.

11. The device of claim 1, further comprising a heat sink to dissipate heat from the transmission line collector.

12. A coupled waveguide photo detector device, comprising:
    evanescently coupled input and output waveguides that are coupled with a nonuniform coupling coefficient that is lowest at the highest optical portion of the input waveguide; and
    a transmission line collector that is phase and velocity matched with the output waveguide.

13. The device of claim 12, wherein the input and output waveguides are coupled with a variable gap.

14. The device of claim 12, wherein the input and output waveguides are multimode waveguides and said output waveguide comprises an asymmetrical multi mode waveguide.

15. The device of claim 12, wherein the transmission line collector comprises a continuous collector.

16. The device of claim 12, wherein transmission line collector comprises a plurality of discrete collectors.

17. The device of claim 12, wherein the transmission line collector comprises a substantially opaque metallic collector.

18. The device of claim 12, further comprising a heat sink to dissipate heat from the transmission line collector.

19. A coupled waveguide photo detector device, comprising:
input and output waveguide means for transferring optical power with a nonuniform efficiency that is lowest at the highest optical portion of the input waveguide; and
transmission line collector means for collecting electrical energy.

20. A coupled waveguide photo detector device, comprising:
an input waveguide;
an output waveguide optically coupled to the input waveguide through a coupling section;
an absorber and transmission line collector structure within the coupling section to convert optical radiation into photo-current; the coupling section and the absorber and transmission line collector structure being set to control maximum intensity of power in the absorber and transmission line collector structure to avoid saturation.

21. The device of claim 20, wherein a transmission line of the absorber and transmission line collector structure is configured such that heat generated by the photo current is evenly distributed and conducted away.

22. The device of claim 20, wherein uniform photo current density in the absorber and collector structure is achieved with an asymmetrical multimode waveguide coupling section.

23. The device of claim 22, wherein the transmission line collector comprises a continuous collector.

24. The device of claim 22, wherein the transmission line collector comprises a plurality of discrete collectors.

25. The device of claim 24, wherein the discrete collectors are spaced apart from each other at a predetermined distance to produce a constant load capacitance.

26. The device of claim 20, further comprising a heat sink to dissipate heat from the transmission line collector.

27. The device of claim 20, wherein the transmission line collector that is phase and velocity matched with the coupling section.

28. The device of claim 20, wherein the output waveguide comprises an asymmetrical multimode waveguide.

29. The device of claim 1, wherein the output waveguide is a multimode waveguide configured for excitation of multiple modes and the nonuniform coupling coefficient and mode pattern are set so that portions of the input waveguide having higher optical power couple less efficiently to the output waveguide than portions of the input waveguide having less optical power.

30. The device of claim 1, wherein the nonuniform coupling coefficient coupling and mode configuration between the input waveguide and the output waveguide is achieved with a variable gap between the input waveguide and the output waveguide.

31. The device of claim 30, wherein the input and output waveguides are straight and angled relative to each other to achieve the variable gap and the mode configuration.

* * * * *

UNITED STATES PATENT AND TRADEMARK OFFICE
CERTIFICATE OF CORRECTION

PATENT NO. : 8,611,709 B2  Page 1 of 1
APPLICATION NO. : 12/991505
DATED : December 17, 2013
INVENTOR(S) : William S. C. Chang et al.

It is certified that error appears in the above-identified patent and that said Letters Patent is hereby corrected as shown below:

In the Specification:

Col. 6, line 27   After "efficiently to the", please delete "input waveguide 16" and insert -- output waveguide 14 -- therefor.

Col. 6, line 28   After "input waveguide", please delete "14" and insert -- 16 -- therefor.

Col. 6, line 29   After "output waveguide", please delete "16" and insert -- 14 -- therefor.

Col. 9, line 8    Before "limited", please delete "be".

Signed and Sealed this
Twenty-eighth Day of October, 2014

Michelle K. Lee
*Deputy Director of the United States Patent and Trademark Office*